2,796,397

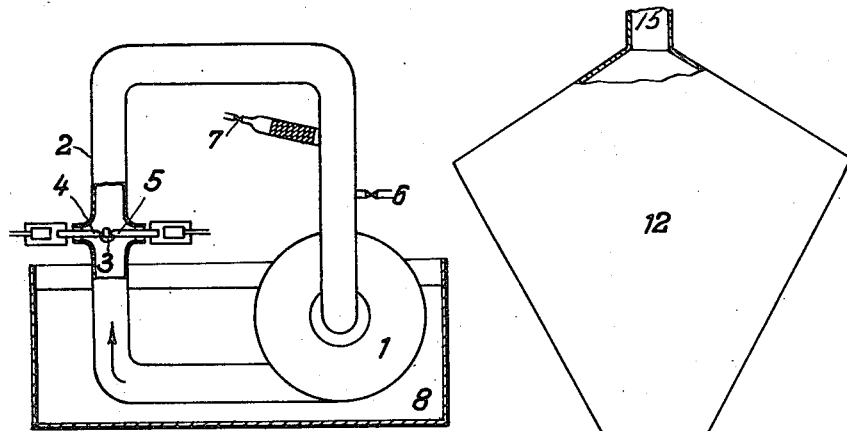
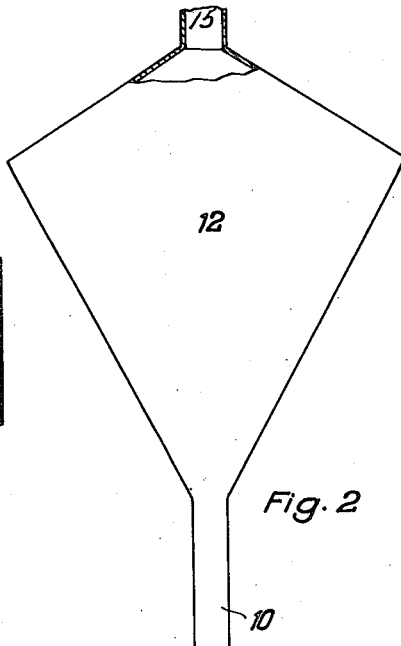
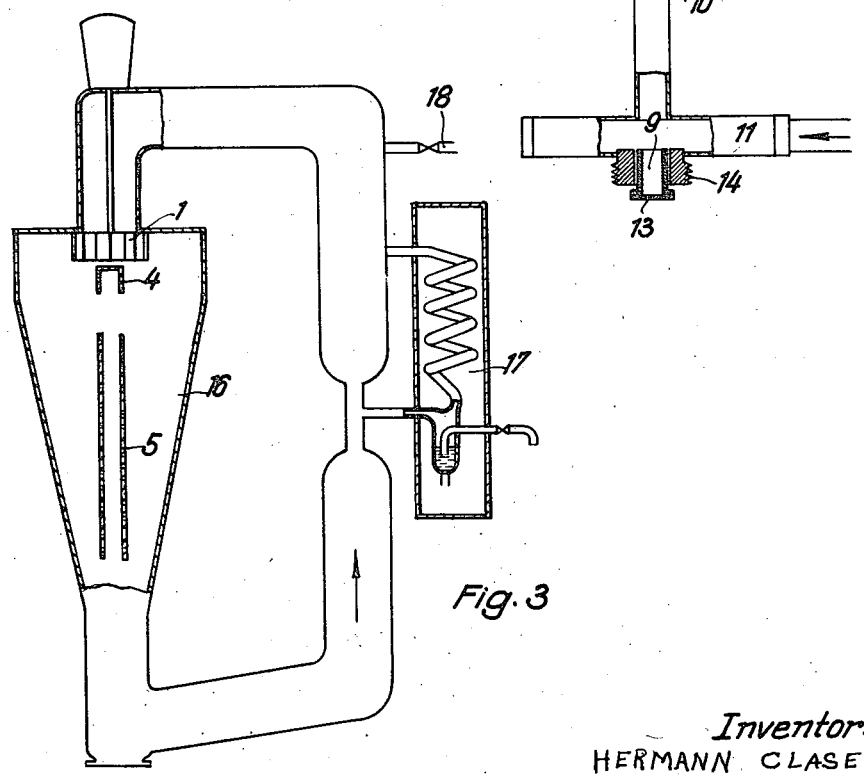

PROCESS FOR THE PRODUCTION OF ORGANIC SILICON COMPOUNDS

Hermann Clasen, Frankfurt am Main, Germany, assignor to Metallgesellschaft Aktiengesellschaft, Frankfurt am Main, Germany Application September 9, 1953, Serial No. 379,205

Claims priority, application Germany September 16, 1952

11 Claims. (Cl. 204—165)

The present invention relates to an improved process for the production of organic silicon compounds directly from silicon.

Previously organic silicon compounds have primarily been prepared from silicon tetrachloride which by reaction with Grignard reagents were converted to halogen containing or halogen free, but fully substituted silanes. The preparation of halogen free silane derivatives has also been accomplished by reacting monosilanes with unsubstituted or substituted hydrocarbons at elevated temperatures.

It has now unexpectedly been found, according to the invention, that organic silicon compounds can be advantageously prepared by reacting elemental silicon with hydrocarbon containing gases. A prerequisite for the reaction is that one or both of the reactants reacts in strongly activated state. This, for example, can be achieved, by passing hydrocarbon containing gases through an electric arc and permitting the gases to react with granulated elemental silicon either while passing through the arc or shortly thereafter. After the reaction, which is advantageously carried out in a whirling layer, the reaction mixture is at once cooled, whereupon the organic silicon compounds can be separated from the gas mixture. In addition to the electric arc method, the activation of the hydrocarbons and/or silicon can also be achieved by direct heating, for example, to a temperature at which silicon vaporizes or the hydrocarbons dissociate. It is also possible to use silicon in especially reactive form, for example, as amorphous silicon or in alloys or in dissolved form or also in the presence of catalysts.

It has already been proposed to produce chloromethyl silanes from methyl chloride and copper activated silicon. While such proposed process produces halogen containing silane derivatives, it is possible according to the process of the invention to produce halogen free silane derivatives, from halogen free hydrocarbons which also can be admixed with hydrogen, nitrogen, small quantities of carbon monoxide and the like. The products produced according to the invention preferably are alkyl or aryl silanes of the general formula $R_nSiH_{4-n}$ in which R is an alkyl or aryl group.

The process according to the invention can, for example, be carried out by recycling a mixture of one or more hydrocarbons and silicon dust through an electric arc and a suitable separator. The separation of the reaction products from the recycled mixture is expediently effected in a mixture of methanol and a concentrated aqueous ammonia solution in which the reaction products dissolve. Upon distilling off the methanol water, and ammonia from the resulting solution, an oily hardenable residue remains which can be burned in a flame to silicon dioxide. Similar results are obtained when, for example, methane, hydrogen and carbon electrodes are employed instead of the hydrocarbons. When water cooled copper electrodes are employed for the arc instead of carbon electrodes and the reaction mixture contains hydrogen, silane can be detected in the reaction product.

In accordance with a further modification of the invention, the hydrocarbon containing gases can be introduced tangentially into the reaction furnace and reacted with silicon dust between a water cooled copper electrode and a water cooled iron electrode. In this modification it is possible to spray water in the gas stream behind the dust layer which is formed to separate any carbon black or silica dust carried along with the gas stream. The alkyl silanes are not decomposed thereby. In case a dust bed of only small dimensions is maintained or only so much silicon dust is fed to the reaction zone as is necessary for reacting with the hydrocarbons (evidently the hydrocarbons decompose to hydrocarbon radicals and atomic hydrogen in the furnace), the water spray also effects quenching of the furnace gases. Other cooling liquids, such as liquid hydrocarbons, which have a high latent heat of vaporization, can be employed in place of water.

The gases withdrawn contain acetylene, ethylene, unconverted hydrocarbons, hydrogen, carbon black and a few percent of alkyl silanes, especially dimethyl silane.

Expediently the bed of silicon dust is maintained sufficiently large that good yields can be obtained. The dust bed is whirled up and down by the flow of the gas stream and as a result the very hot furnace gases come into good contact with the silicon and the resulting reaction products are cooled off in the next moment upon contact with silicon dust which is still cold. The dust bed automatically cleans itself from resulting slags as the larger particles which are not carried along with the gas stream fall down and can be withdrawn from the bottom of the apparatus.

The separation and purification of the gases drawn off can be effected by known procedures, for example, by fractional condensation or selective solvents.

The process according to the invention can also be carried out, for example, by recycling a hydrocarbon such as propane through a melt of silicon, aluminum and tin or the like heated to about 400° C. A highly polymeric alkyl silane is obtained in this way by the reaction between the silicon and the propane, which oily product can be separated from the recycled gas stream, for example, with the aid of a caustic potash solution followed by $P_2O_5$. Upon acidification of the potash solution the oily alkyl silane separates out.

Amorphous silicon can be employed according to the invention by passing a stream of a gas mixture of hydrogen and ethylene through it at a pressure of 400 atmospheres gauge pressure and a temperature of 400° C. in the presence of magnesium iodide. The products formed, as was found, were alkyl silanes in addition to ethane and polyethylene.

The process according to the invention can also be carried out by arranging a high percentage ferrosilicon rod axially in a water cooled metal tube. The rod is strongly heated by connecting it to an electric current. Upon passage of a mixture of hydrogen and methane through the tube volatile silicon products are carried along with the gas stream while silicon rich, hydrocarbon containing solid and oily products precipitate upon the cooled walls of the tube.

The process according to the invention provides an economical process for the production of silanes which are partially alkyl and/or aryl substituted. When the reactant gas mixture contains oxygen, oxygen containing organic silicon compounds can also be formed. The alkyl and aryl silanes with Si-H and/or Si-Si linkages are substances which are hydrolysable and condensible to siloxanes from which valuable oils, resins and other materials can be produced without the incidence of hydrochloric acid during the hydrolysis. The process according to the invention can also be carried out under pressure.

Several modifications of apparatus suitable for carrying out the process according to the invention are shown digrammatically in Figs. 1–3 of the accompanying drawing.

In the apparatus shown in Fig. 1 and 1a, the blower 1 circulates a mixture of hydrogen and silicon dust through tube 2. An electric arc 3 is provided between carbon electrodes 4 and 5, and the carbon from such electrodes reacts with the hydrogen to form hydrocarbons. Inlet 6 serves for the continuous introduction of hydrogen into the recirculating gas. A dust separator 7 is provided for the withdrawal of gas from the cycle, which gas can, for example, be passed through wash bottles (not shown) which can be filled with a mixture of methanol and a concentrated aqueous ammonia solution. Trough 8 to carry cooling water is provided for regulating the temperature of the gas leaving the electric arc.

In the apparatus disclosed in Fig. 2, 9 signifies a water cooled cylindrical copper cathode, whereas 10 is a tubular water cooled iron anode about 1 meter long. The gases to be reacted are introduced into the furnace housing 11 in the direction of the arrow and are reacted with silicon which trickles down from conically shaped vessel 12 within the arc formed between electrodes 9 and 10. Through the opening 13 slag may be withdrawn formed by reaction. 14 designates an insulator, for example, of porcelain. When purified natural gas was passed through the apparatus at a velocity of about 1000 meters per second and a voltage of about 7000 volts and a current of about 1000 amp. were employed for the arc, the gas withdrawn through line 15 mainly consisted of acetylene, ethylene, unconverted hydrocarbons and hydrogen from which alkyl and aryl silanes especially dimethyl silane could be separated.

In case of the installation being operated at increased gas pressure, for example 70 lbs./sq. in. at least 10,000 kw. will be required instead of 7000 kw. Besides the granulated silicon the black carbon formed by cracking of methane and accumulating in the vessel 12 participates in the reaction and also reacts as a cooling medium.

In the apparatus shown in Fig. 3, a rather large quantity of commercial crystalline iron containing silicon ground as fine as possible together with carbon monoxide free coke oven gas were recycled with the aid of blower 1. Portion 16 of the apparatus operates as a centrifugal separator, so that the quantity of silicon dust reaching the arc between electrodes 4 and 5 could be regulated. The condensable reaction products were separated in cooler 17, whereas inlet 18 served for the introduction of fresh gas. The hydrocarbons containing gases employed for the reaction with silicon according to the invention can also be suitably produced by reacting hydrogen with carbon formed by cracking.

I claim:
1. A process for the production of halogen-free organic silicon compounds of the general formula $R_nSiH_{4-n}$ where in R is selected from the group consisting of alkyl and aryl groups which comprises contacting a hydrocarbon containing gas with elemental silicon, in an electric arc discharge and rapidly cooling off the resulting halogen-free organic silicon compound products.
2. A process according to claim 1, in which reactants employed are heated to a temperature at which silica vaporizes.
3. A process according to claim 1, in which reactants employed are heated to a temperature at which the gases dissociate.
4. A process according to claim 1, in which reactants employed are heated by an electric arc discharge between hot electrodes.
5. A process according to claim 1, in which reactants employed are heated by an electric arc discharge between cold electrodes.
6. A process according to claim 1, in which the silicon reactant is in amorphous form.
7. A process according to claim 1, in which the silicon reactant is in finely divided state.
8. A process according to claim 1, in which the silicon reactant is in a finely divided state and the solid particles of the silicon contacted with the hydrocarbon containing gas are maintained in a fluidized bed of the silicon maintained by an upwardly directed stream of the gaseous reaction components.
9. A process according to claim 1, in which the process is carried out at an elevated pressure.
10. A process according to claim 1, comprising in addition spraying the halogen-free organic silicon compound products immediately after their formation with a volatile cooling liquid.
11. A process according to claim 1 in which the halogen-free organic silicon compound products are conducted through a fluidized bed of a cooling medium immediately after their formation to effect rapid cooling of the reaction products.

References Cited in the file of this patent

UNITED STATES PATENTS

| 560,291 | Acheson | May 19, 1896 |
| 1,075,634 | Egly | Oct. 14, 1913 |
| 2,405,019 | Dalin | July 30, 1946 |

OTHER REFERENCES

Butler: "Journal of the Electrochemical Society," March 1952 (vol. 99), pp. 55C–54C.